United States Patent
Maeshima

(10) Patent No.: US 6,346,874 B1
(45) Date of Patent: Feb. 12, 2002

(54) TRANSMITTER AND RECEIVER, AND COMMUNICATION SYSTEM AND COMMUNICATION METHOD

(75) Inventor: Yasunori Maeshima, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/219,842

(22) Filed: Dec. 23, 1998

(30) Foreign Application Priority Data

Dec. 27, 1997 (JP) .......................... P09-367565

(51) Int. Cl.[7] .................. G06F 11/00; G06F 11/30; G08C 25/00; H03M 13/00; H04L 1/00
(52) U.S. Cl. ......................... 340/5.2; 714/746
(58) Field of Search ........................ 714/758; 340/5.2

(56) References Cited

U.S. PATENT DOCUMENTS

| | | | | |
|---|---|---|---|---|
| 5,396,230 A | * | 3/1995 | Motegi | 340/825.44 |
| 5,554,977 A | * | 9/1996 | Jablonski et al. | 340/5.26 |
| 5,613,138 A | * | 3/1997 | Kishi et al. | 712/18 |
| 5,892,924 A | * | 4/1999 | Lyon et al. | 709/245 |
| 6,195,401 B1 | * | 2/2001 | Hatakeyama et al. | 375/341 |
| 6,202,188 B1 | * | 3/2001 | Suzuki et al. | 714/758 |

OTHER PUBLICATIONS

S. Fukushima, T. Kurokawa and Y. Sakai, "Image encipherment based on optical parallel processing using spatial light modulators", IEEE Photonics Technology Letters, pp. 1133–1135, Dec. 1991, vol. 3, Issue: 12.*

* cited by examiner

Primary Examiner—Albert Decady
Assistant Examiner—Joseph Torres
(74) Attorney, Agent, or Firm—Jay H. Maioli

(57) ABSTRACT

A communication system capable of avoiding crosstalk with a simple structure. By assigning the same identification-number data to a transmitter and a receiver, performing the logical operation for the identification-number data with the logical operation circuit of the transmitter and the receiver, and detecting errors in the operation results by using error detection circuit, it is possible to perform enciphering and certifying without increasing communications traffic and thus avoid crosstalk with a simple structure because it is unnecessary to add and transmit the identification-number data.

20 Claims, 6 Drawing Sheets

TRANSMITTER AND RECEIVER, AND COMMUNICATION SYSTEM AND COMMUNICATION METHOD

BACKGROUND OF THE INVENTION

1. Field of the Invention

This invention relates to a transmitter, a receiver, and a communication system and a communication method, and more particularly, is applicable to a radio network system for radio-transmitting digital data.

2. Description of the Related Art

The radio network system includes a system for radio-transmitting digital data such as image data between an AV (Audio Video) unit sets and a PC (Personal Computer) in a house or company. The radio network system realizes multi carrier transmission by using an orthogonal-frequency-division multiplexing system referred to as the orthogonal frequency division multiplex (OFDM) system as a modulation system.

In the case of this type of radio communication system, crosstalk may occur due to the fact that radio waves of another adjacent network reach the network of its own. Therefore, to avoid the crosstalk, a method is considered which avoids the fact that radio waves of other network are erroneously connected by adding a network ID (Identification) to radio waves to transmit it and identifying radio waves belonging to a network by the network ID. However, this method has a problem that the overhead occurs that the communications traffic of transmission data increases because it is necessary to add a network ID to the transmission data.

SUMMARY OF THE INVENTION

In view of the foregoing, an object of this invention is to provide a transmitter, a receiver, and a communication system and communication method capable of avoiding crosstalk with a simple structure.

The foregoing object and other objects of the invention have been achieved by the provision of a transmitter for transmitting input data after applying predetermined data processing to the input data. The transmitter comprises: error-detection-code addition means for adding an error detection code to the input data; logical operation means for generating transmission data by applying the logical operation between the output data output from the error-detection-code addition means and the identification-number data assigned to the transmitter to the transmission data; and transmission means for transmitting the transmission data after applying predetermined transmission processing to the transmission data.

Further, this invention provides a receiver for receiving a transmission signal transmitted from a transmitter. The receiver comprises: reception means for receiving the transmission signal; logical operation means for performing the logical operation between the reception data received by the reception means and the identification-number data assigned to the receiver; and error detection means for detecting an error in the output data in accordance with an error detection code added to the output data output from the logical operation means and disusing the output data when the error is detected.

Further, this invention provides a communication system for performing communication between a transmitter and a receiver. In the communication system, the transmitter has error-detection-code addition means for adding an error detection code to input data, first logical operation means for generating transmission data by performing the logical operation between the first output data output from the error-detection-code addition means and the first identification-number data assigned to the transmitter, and transmission means for transmitting a transmission signal generated by applying predetermined transmission processing to the transmission data. Also, in the communication system, the receiver has reception means for receiving the transmission signal, second logical operation means for performing the logical operation between reception data received by the reception means and the second identification-number data assigned to the receiver and same as the first identification-number data, and error detection means for detecting an error in the second output data in accordance with the error detection code added to the second output data output from the second logical operation means and disusing the second output data when the error is detected.

Further, this invention provides a communication method, which comprises the steps of: generating the first output data by adding an error detection code to input data; generating transmission data by performing the logical operation between the first output data and the first identification-number data; generating and transmitting a transmission signal by applying predetermined transmission processing to the transmission data; generating the second output data by performing the logical operation between reception data obtained by receiving the transmission signal and the second identification-number data same as the first identification-number data; and detecting an error in the second output data in accordance with an error detection code added to the second output data and disusing the second output data when the error is detected.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) Structure of Radio Network System

Figure 1:
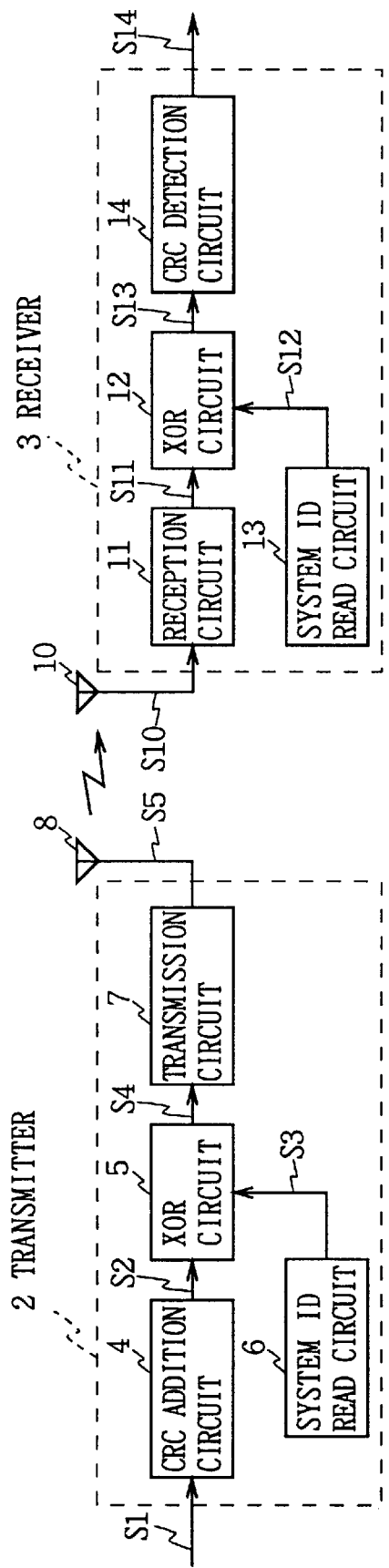
FIG. 1 is a block diagram showing the structure of the radio network system according to an embodiment of the present invention.

In FIG. 1, symbol 1 denotes a radio network system to which the present invention is applied, which has a transmitter 2 and a receiver 3. The transmitter 2 and the receiver 3 are mounted on an AV unit or PC set in a house or company and used for the communication between AV units, the communication from an AV unit to a PC, or the communication from a PC to an AV unit.

The transmitter 2 inputs transmission data S1 supplied through a predetermined data processing circuit to a cyclic redundancy check (CRC) addition circuit 4. The CRC addition circuit 4 adds a CRC code to the transmission data S1 every predetermined number of bits and outputs transmission data S2 thereby obtained to an exclusive-OR (XOR) circuit 5.

A system ID number peculiar to the radio network system 1 to which the transmitter 2 belongs is previously set to the transmitter 2 and stored in, for example, storage means such as an integrated circuit (IC) card. A system ID read circuit 6 reads a system ID number from the storage means and outputs the system ID number to the exclusive-OR circuit 5 as system ID number data S3.

The exclusive-OR circuit 5 computes the exclusive OR between the transmission data S2 and the system ID number data S3 every predetermined number of bits as described above and outputs transmission data S4 thereby obtained to a transmission circuit 7. The transmission circuit 7 performs the multicarrier modulation processing according to the OFDM method to generate transmission signal S5, and supplies the signal S5 to an antenna 8. Thereby, the transmission signal S5 is transmitted through the antenna 8.

The receiver 3 inputs reception signal S10 received by the antenna 10 to a reception circuit 11. The reception circuit 11 performs a predetermined demodulation processing according to the OFDM method to generate reception data S11, and outputs the data S11 to an exclusive-OR circuit 12. A system ID number is previously set to the receiver 3 similarly to the case of the transmitter 2 and stored in storage means. A system ID read circuit 13 reads the system ID number and outputs the ID number to the exclusive-OR circuit 12 as system ID number data S12.

The exclusive-OR circuit 12 computes the exclusive OR between the reception data S11 and the system ID number data S12 every predetermined number of bits and outputs the reception data S13 thereby obtained to a CRC detection circuit 14. The CRC detection circuit 14 detects an error in the reception data S13 by using a CRC code and outputs reception data S14 thereby obtained to a predetermined data processing circuit provided at the rear stage.

(2) Structure of Transmission Circuit

The structure of the transmission circuit 7 is described below by referring to FIG. 2. The transmission circuit 7 inputs the transmission data S4 output from the exclusive-OR circuit 5 to a convolution-encoding circuit 20. The convolution-encoding circuit 20 convolution-encodes the transmission data S4 and outputs the transmission data S5 thereby obtained to a Quadrature phase shift keying (QPSK modulation) circuit 21.

The QPSK modulation circuit 21 QPSK-modulates the transmission data S5 and outputs transmission signal S6 thereby obtained to a serial-parallel conversion circuit 22. The serial-parallel conversion circuit 22 converts the transmission signal S6 supplied in the form of a serial data string into transmission signals $S7_1$ to $S7_N$ of a parallel data string and outputs the signals $S7_1$ to $S7_N$ to an inverse fast Fourier transform (inverse FFT) circuit 23. The inverse fast Fourier transform circuit 23 applies the inverse fast Fourier transform to the transmission signals $S7_1$ to $S7_N$ to map the transmission signals $S7_1$ to $S7_N$ to frequency-region data, and outputs transmission signals $S8_1$ to $S8_N$ thereby obtained to a parallel-serial conversion circuit 24. The parallel-serial conversion circuit 24 converts the transmission signals $S8_1$ to $S8_N$ supplied in the form of a parallel data string into a serial data string and outputs transmission signal S9 thereby obtained to a low-pass filter 25.

In this case, the serial-parallel conversion circuit 22, inverse fast Fourier transform circuit 23, and parallel-serial conversion circuit 24 convert the transmission signal S6 into multicarrier signal according to the OFDM method. The OFDM method makes it possible to obtain a high bit rate as a whole by using a plurality of subcarriers in which carriers perpendicularly intersect each other at a frequency interval of $f_0$ so that interference does not occur between codes and thereby assigning a low-bit-rate signal to each subcarrier.

Figure 3:
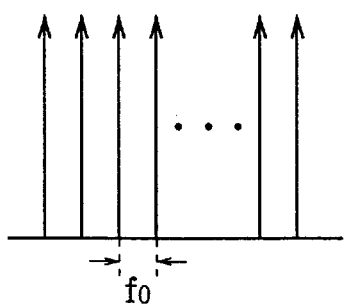
FIG. 3 is a schematic diagram showing subcarriers according to the OFDM method.

FIG. 3 shows a spectrum of a carrier waveform of the OFDM method. As shown in FIG. 3, in the case of the OFDM method, the transmission signal S6 is assigned to subcarriers perpendicularly intersecting each other at a frequency interval of $f_0$ to transmit the transmission signal S6.

The OFDM method parallel-converts the transmission signal S6, applies the inverse fast Fourier transform to the parallel-converted transmission signals $S7_1$ to $S7_N$ and thereby assigns the transmission signals $S7_1$ to $S7_N$ to subcarriers. In the case of decoding, however, the method fetches the data assigned to the subcarriers by capturing signal components from the subcarriers every interval $f_0$ and performing the fast Fourier transform processing.

Figure 2:
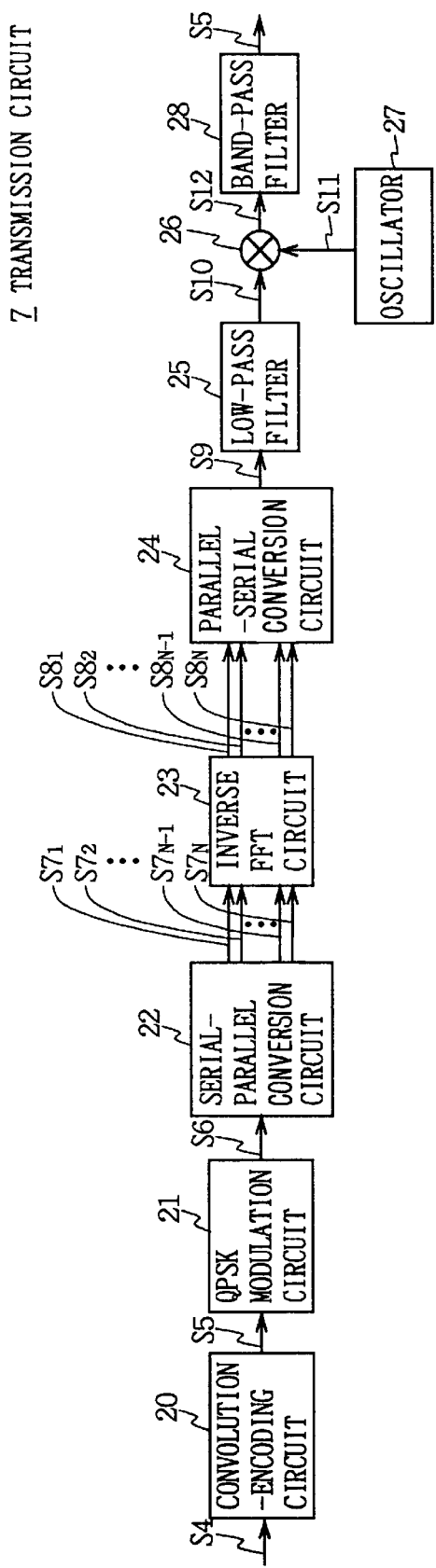
FIG. 2 is a block diagram showing the structure of a transmission circuit.

In FIG. 2, the low-pass filter 25 removes unnecessary components and noises out of low frequencies from the transmission signal S9 and outputs the transmission signal S10 thereby obtained to a frequency conversion circuit 26. The frequency conversion circuit 26 multiplies the transmission signal S10 by a local oscillation signal S11 supplied from an oscillator 27 to generate transmission signal S12 frequency-converted into a predetermined frequency, and outputs the signal S12 to a band-pass filter 28. The band-pass filter 28 removes unnecessary components and noises out of the band from the transmission signal S12 and supplies the transmission signal S5 thereby obtained to the antenna 8.

(3) Structure of Reception Circuit

Figure 4:
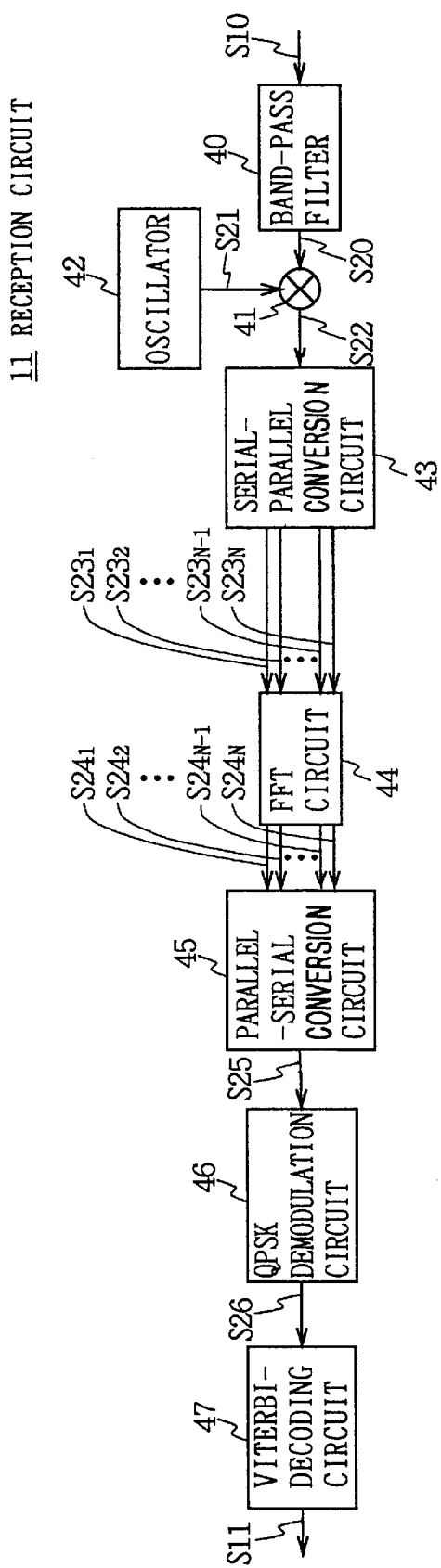
FIG. 4 is a block diagram showing the structure of a receiver.

Then, the structure of the reception circuit 11 is described below by referring to FIG. 4. The reception circuit 11 inputs the reception signal S10 received through the antenna 10 to a band-pass filter 40. The band-pass filter 40 removes unnecessary components and noises out of the band from the reception signal S10 and outputs reception signal S20 thereby obtained to a frequency conversion circuit 41. The frequency conversion circuit 41 multiplies the reception signal S20 by the local oscillation signal S21 supplied from an oscillator 42 to generate intermediate-frequency reception signal S22, and outputs the signal S22 to a serial-parallel conversion circuit 43.

The serial-parallel conversion circuit 43 parallel-converts the reception signal S22 and outputs reception signals $S23_1$ to $S23_N$ thereby obtained to a fast Fourier transform (FFT) circuit 44. The fast Fourier transform circuit 44 applies the fast Fourier transform processing to the reception signals $S23_1$ to $S23_N$ and outputs reception signals $S24_1$ to $S24_N$ thereby obtained to a parallel-serial conversion circuit 45. The serial parallel-serial conversion circuit 45 converts the reception signals $S24_1$ to $S24_N$ into reception signal S25 of a serial data string and outputs the signal S25 to a QPSK demodulation circuit 46.

In this case, the serial-parallel conversion circuit 43, the fast Fourier transform circuit 44, and the parallel-serial conversion circuit 45 decode the reception signal S22 according to the OFDM method. That is, effective data is cut off by the serial-parallel conversion circuit 43 and a reception waveform is captured every interval $f_0$ and converted into parallel data. The output of the serial-parallel conversion circuit 43 is supplied to the fast Fourier transform circuit 44 and fast-Fourier-transformed. Thus, decoding according to the OFDM method is performed by fast-Fourier-transforming a waveform sampled every interval $f_0$.

The QPSK demodulation circuit 46 applies the QPSK demodulation processing to the reception signal S25 to restore the reception data S26, and outputs the reception data S26 to a Viterbi-decoding circuit 47. The Viterbi-decoding circuit 47 Viterbi-decodes the reception data S26 and outputs the reception data S11 thereby obtained to the exclusive-OR circuit 12.

(4) Data Processing by Radio Network System

Figure 5:
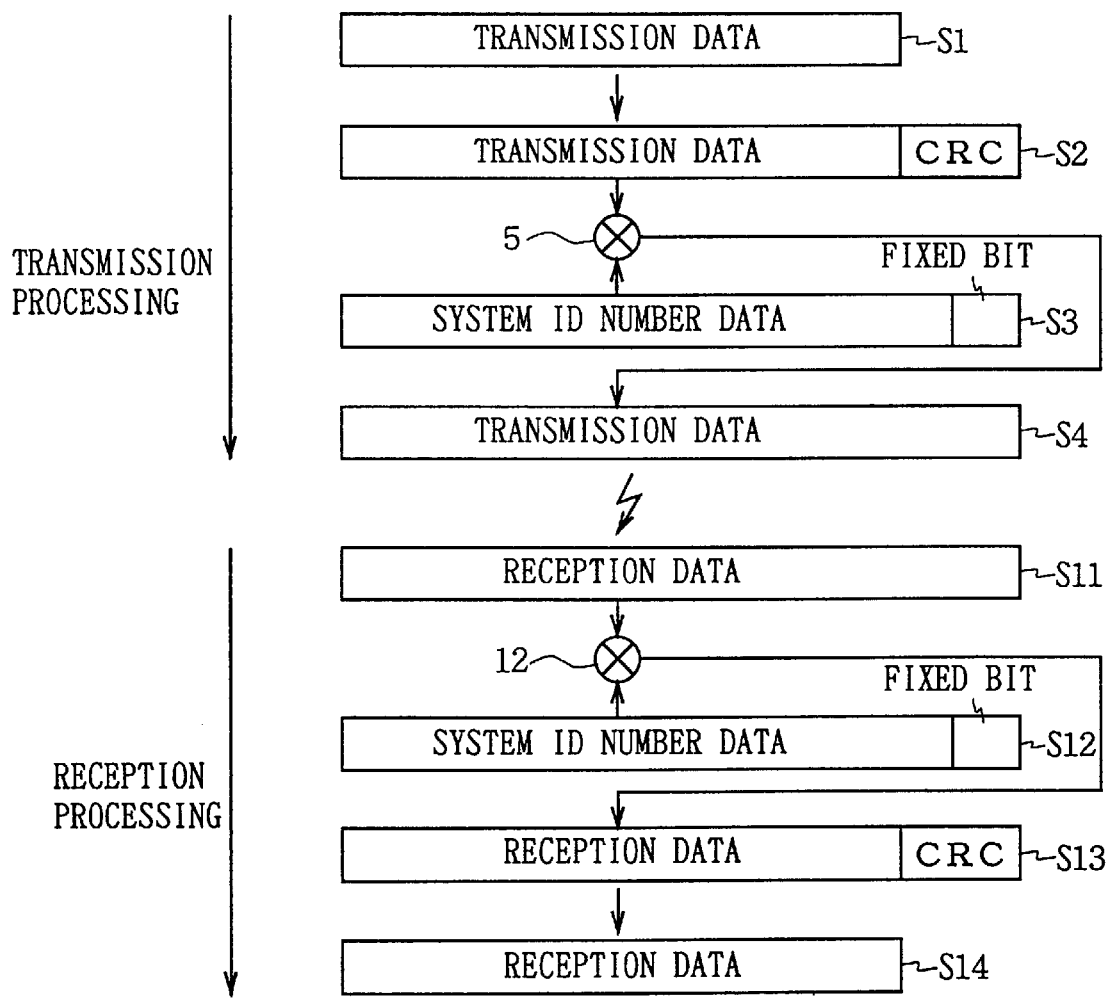
FIG. 5 is a schematic diagram showing the data processing by a radio network system.

The data processing by the radio network system 1 is described below by referring to FIG. 5. In the transmitter 2, the CRC addition circuit 4 adds a CRC code to the reception data S1 every predetermined number of bits to generate the transmission data S2, and outputs the data S2 to the exclusive-OR circuit 5.

However, if the length of the system ID number data S3 is different from that of the transmission data S2, the exclusive OR between the data S3 and S2 cannot be computed. Therefore, the system ID read circuit 6 applies the data processing for equalizing the length of the system ID number data S3 with that of the transmission data S2 to the data S3 and then, outputs the system ID number data S3 to the exclusive-OR circuit 5.

When the length of the system ID number data S3 is smaller than that of the transmission data S2, for example, when the length of the system ID number data S3 is sixty-four bits and that of the transmission data S2 is sixty-seven bits, the system ID read circuit 6 generates the system ID number data S3 by combining three fixed bits "000" with the tail of the system ID number data S3 and equalizes the length of the system ID number data S3 with that of the transmission data S2, and thereafter outputs the system ID number data S3 to the exclusive-OR circuit 5.

The exclusive-OR circuit 5 generates the transmission data S4 by computing the exclusive OR between the transmission data S2 and the system ID number data S3 every predetermined number of bits. The transmission circuit 7 applies a predetermined modulation processing to the transmission data S5 and then, the data S4 is transmitted through the antenna 8.

The receiver 3 supplies the reception signal S10 received through the antenna 10 to the reception circuit 11 and applies a predetermined demodulation processing to the signal S10 through the reception circuit 11 and thereafter, outputs the signal S10 to the exclusive-OR circuit 12. The system ID read circuit 13 generates the system ID data S12 by inserting a fixed bit into the system ID number data S12 similarly to the case of the system ID read circuit 6 of the transmitter 2, equalizes the length of the system ID number data S12 with that of the reception data S11, and then outputs the system ID number data S12 to the exclusive-OR circuit 12.

The exclusive-OR circuit 12 computes the exclusive OR between the reception data S11 and the system ID number data S12 every predetermined number of bits and outputs the reception data S13 thereby obtained to the CRC detection circuit 14. The CRC detection circuit 14 detects an error in the reception data S13 by using a CRC code and outputs the reception data S14 thereby obtained to a predetermined data processing circuit.

(5) Data Processing Procedures by Transmitter and Receiver

Figure 6:
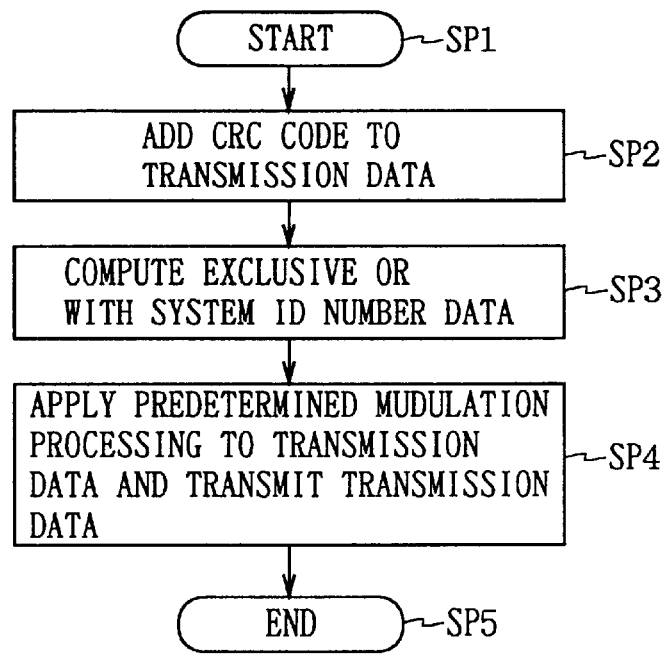
FIG. 6 is a flowchart showing the data processing procedure by a transmitter.

Then, the data processing procedure by the transmitter 2 is described below by referring to FIG. 6. First, at step SP2 after entered from step SP1, the CRC addition circuit 4 adds a CRC code to the transmission data S1. At step SP3, the exclusive-OR circuit 5 computes the exclusive OR between the transmission data S2 to which a CRC code is added and the system ID number data S3 supplied from the system ID read circuit 6 and outputs the transmission data S4 thereby obtained to the transmission circuit 7. At step SP4, the transmission circuit 7 applies the multicarrier modulation processing to the transmission data S4 to generate the transmission signal S5, and transmits the signal S5 through the antenna 8. Then, the processing proceeds to step SP5 to be terminated.

Figure 7:
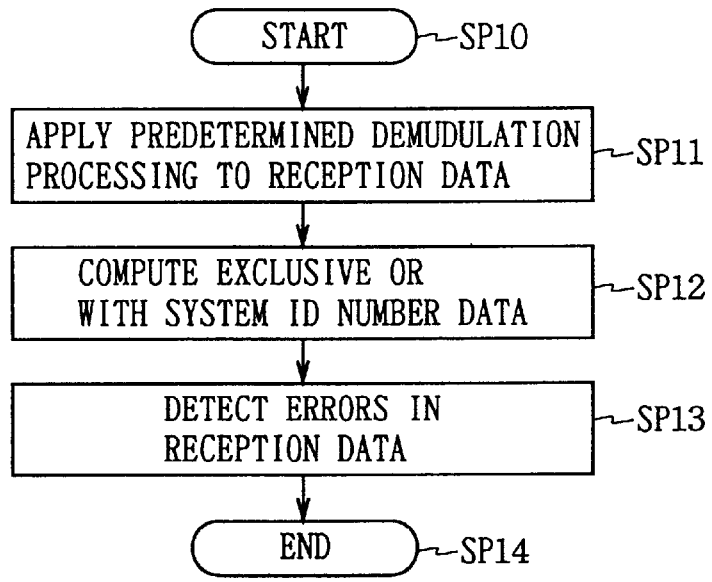
FIG. 7 is a flowchart showing the data processing procedure by a receiver.

Then, the data processing procedure by the receiver 3 is described below by referring to FIG. 7. First, at step SP11 after entered from step SP10, the reception circuit 11 applies the multicarrier demodulation processing to the reception signal S10 received through the antenna 10 to generate the reception data S11, and outputs the signal S11 to the exclusive-OR circuit 12. At step SP12, the exclusive-OR circuit 12 computes the exclusive OR between the reception data S11 and the system ID number data S3 supplied from the system ID read circuit 13 and outputs the reception data S13 thereby obtained to the CRC detection circuit 14. At step SP13, the CRC detection circuit 14 detects an error in the reception data S13 and outputs the reception data S14 thereby obtained to a data processing circuit at the rear stage. Then, the processing proceeds to step SP14 to be terminated.

(6) Operations and Effects

According to the above structure, in the transmitter 2, the exclusive-OR circuit 5 computes the exclusive OR between the transmission data S2 to which a CRC code is added and the system ID number data S3 peculiar to the radio network system 1 and transmits the transmission data S4 thereby obtained. In the receiver 3, on the contrary to this, the exclusive-OR circuit 12 computes the exclusive OR between the reception data S11 and the system ID number data S12 and outputs the reception data S13 thereby obtained to the CRC detection circuit 14. The CRC detection circuit 14 checks the reception data S13 for errors by using a CRC code and outputs the reception data S14 thereby obtained to a data processing circuit at the rear stage.

When the receiver 3 receives the transmission signal S5 from the transmitter 2 belonging to the same radio network system 1, the exclusive-OR circuit 12 computes an exclusive OR because the system ID number data S3 and S12 of the transmitter 2 and receiver 3 are the same. Thereby, an exclusive OR is computed for the transmission data S2 up to twice. Therefore, the exclusive-OR circuit 12 restores the reception data S13 same as the transmission data S2 of the transmitter 2 and outputs the data S13 to the CRC detection circuit 14. The CRC detection circuit 14 generates the reception data S14 by checking the reception data S13 for errors by using a CRC code and outputs the reception data S14.

However, when receiving a transmission signal from a transmitter belonging to other radio network system, the receiver 3 cannot restore original transmission data even if an exclusive OR is computed by the exclusive-OR circuit 12 because the system ID number data S12 is different from the system ID number data of the transmitter. Therefore, the exclusive-OR circuit 12 generates the reception data S13 different from the original transmission data and outputs the data S13 to the CRC detection circuit 14. The CRC detection circuit 14 checks the reception data S13 for errors by using a CRC code and then, disuses the data S13 because of deciding that a transmission error occurs in the reception data S13.

Thus, the receiver 3 cannot restore the original transmission data S2 when it does not have the system ID number data S12 same as the system ID number data S3 of the transmitter 2. Therefore, the transmitter 2 can perform enciphering using a system ID number peculiar to a network as a key by computing the exclusive OR between the transmission data S2 and the system ID number data S3. Moreover, the receiver 3 can certify the transmitter 2 by computing the exclusive OR between the reception data S11 and the system ID number data S12.

Thus, the transmitter 2 can perform enciphering without increasing communications traffic because it is unnecessary to transmit the system ID number data S3 serving as a key by adding it to the transmission data S2 and secure communication safety. Therefore, it is possible to prevent illegal access and illegal interception. Moreover, the receiver 3 can certify a communication counterpart without increasing communications traffic because it is unnecessary to add a system ID number to the transmission data S2 at the transmitter-2 side. Therefore, it is possible to prevent erroneous connection and avoid crosstalk.

According to the above structure, it is possible to perform enciphering and certifying without increasing communications traffic because it is unnecessary to transmit the transmission data S2 by adding a system ID number to the data S2 by computing the exclusive OR between the transmission data S2 and the system ID number data S3 with the transmitter 2 and thereafter transmitting the data and computing the exclusive OR between the reception data S11 and the system ID number data S12 with the receiver 3 and thereafter detecting errors. Thus, it is possible to avoid crosstalk with a simple structure.

(7) Other Embodiment

The above described embodiment has been dealt with a case where a fixed bit is combined with the tails of the system ID number data S3 and S12. However, the present invention is not limited to this, but it is possible to obtain the same advantage as the above-mentioned by combining a fixed bit with the heads of the system ID number data S3 and S12 or inserting a fixed bit into the middles of the system ID number data S3 and S12 and then computing an exclusive OR. In short, it is possible to compute an exclusive OR after equalizing the lengths of the system ID number data S3 and S12 with those of the transmission data S2 and the reception data S11.

Moreover, the above embodiment has been dealt with a case where a fixed bit is combined with or inserted into the system ID number data S3 and S12 by the system ID read circuits 6 and 13. However, the present invention is not limited to this. In short, it is possible to use any data addition means as long as the means can supply the system ID number data S3 and S12 in which the length of the former data is equalized with that of the latter data by adding desired data to the exclusive-OR circuits 5 and 12.

Figure 8:
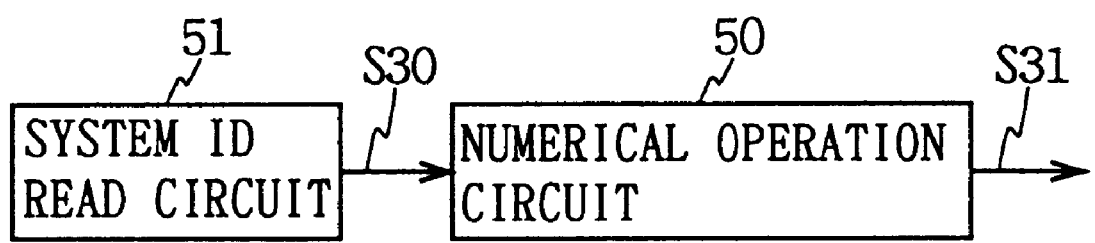
FIG. 8 is a block diagram showing number-of-bits conversion processing.

Furthermore, the above embodiment has been dealt with a case where the lengths of the system ID number data S3 and S12 are equalized with those of the transmission data S2 and the reception data S11 by combining a fixed bit with the system ID number data S3 and S12 when the lengths of the system ID number data S3 and S12 are smaller than those of the transmission data S2 and the reception data S11. However, the present invention is not limited to this. When the lengths of the system ID number data S3 and S12 are larger than those of the transmission data S2 and the reception data S11, the same advantage as the above-mentioned can be obtained by using a numerical operation circuit 50 constituted with, for example, a pseudo-random-number generation circuit, converting system ID number data S30 output from a system ID read circuit 51 with the numerical operation circuit 50 by the number of bits, and outputting system ID number data S31 which is the above operation result to the exclusive-OR circuits 5 and 12 as shown in FIG. 8. For example, when the number of bits of the transmission data S2 is "22" and the number of bits of the system ID number data S30 is "64", it is possible to compute an exclusive OR by changing the number of bits of the system ID number data S30 from sixty-four bits to twenty-two bits with the numerical operation circuit 50 and thereafter, supplying the data 30 to the exclusive-OR circuit 5. In short, it is possible to compute an exclusive OR after applying the numerical operation processing for equalizing the lengths of the system ID number data S3 and S12 with those of the transmission data S2 and the reception data S11 to the system ID number data S3 and S12.

Furthermore, the above embodiment has been dealt with a case where the convolution-encoding circuit 20 is set to the rear stage of the exclusive-OR circuit 5 and the Viterbi-decoding circuit 47 is set to the front stage of the exclusive-OR circuit 12. However, the present invention is not limited to this. It is possible to obtain the same advantage as the above-mentioned by setting a convolution-encoding circuit to the front stage of the exclusive-OR circuit 5 and setting a viterbi-decoding circuit to the rear stage of the exclusive-OR circuit 12.

Furthermore, the above embodiment has been dealt with a case where an exclusive OR is computed twice with the exclusive-OR circuit 5 of the transmitter 2 and the exclusive-OR circuit 12 of the receiver 3. However, the present invention is not limited to the above case. In short, it is possible to use a logical operation circuit for restoring the original transmission data S2 by performing logical operation twice. Also in this case, it is possible to obtain the same advantage as the above-mentioned.

Furthermore, the above embodiment has been dealt with a case where a CRC code is added to the transmission data S1. However, the present invention is not limited to the above case. It is also possible to obtain the same advantage as the above-mentioned by adding one of various other error detection codes including parity bits.

Furthermore, the above embodiment has been dealt with a case where the OFDM method is used as a modulation method. However, the present invention is not limited to the above case. It is also possible to obtain the advantage same as the above-mentioned by using one of various other modulation methods including the time division multiple access (TDMA) method and code division multiple access (CDMA) method.

As described above, the present invention makes it possible to perform enciphering and certifying without increasing communications traffic because it is unnecessary to add and transmit identification-number data because of assigning the same identification-number data to a transmitter and a receiver, performing the logical operation using identification-number data in a transmitter and a receiver and detecting an error in the operation results. Thus it is possible to avoid crosstalk with a simple structure.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A transmitter for transmitting input data after applying predetermined data processing to the input data, comprising:

error-detection-code addition means for adding an error detection code to the input data;

logical operation means for generating transmission data by applying a logical operation between output data outputted from the error-detection-code addition means and identification-number data assigned to the transmitter;

transmission means for transmitting the transmission data after applying predetermined transmission processing to the transmission data; and data addition means for supplying, to the logical operation means, the identification-number data in which a length of the identification-number data is equalized with a length of the output data by adding desired data to the identification-number data when the length of the identification-number data is smaller than the length of the output data.

2. The transmitter according to claim 1, wherein the logical operation means performs an exclusive-OR operation between the output data outputted from the error-detection-code addition means and the identification-number data assigned to the transmitter.

3. The transmitter according to claim 1, wherein the transmission means performs the transmission processing based on an orthogonal frequency division multiplex method on the transmission data.

4. The transmitter according to claim 1, wherein the transmission means performs the transmission processing based on a code division multiple access method on the transmission data.

5. A transmitter for transmitting input data after applying predetermined data processing to the input data, comprising:

error-detection-code addition means for adding an error detection code to the input data;

logical operation means for generating transmission data by applying a logical operation between output data outputted from the error-detection-code addition means and identification-number data assigned to the transmitter;

transmission means for transmitting the transmission data after applying predetermined transmission processing to the transmission data; and numerical operation means for supplying, to the logical operation means, the identification-number data in which a length of the identification-number data is equalized with a length of the output data by applying a predetermined numerical operation to the identification-number data when the length of the identification-number data is larger than the length of the output data.

6. A receiver for receiving a transmission signal transmitted from a transmitter, comprising:

reception means for receiving the transmission signal;

logical operation means for performing a logical opereation between reception data received by the reception means and identification-number data assigned to the receiver;

error detection means for detecting an error in output data outputted from the logical operation means in accordance with an error detection code added to the output data and for ceasing use of the output data when the error is detected; and data addition means for supplying, to the logical operation means, the identification-number data in which a length of the identification-number data is equalized with a length of the reception data by adding desired data to the identification-number data when the length of the identification-number data is smaller than the length of the reception data.

7. The receiver according to claim 6, wherein the logical operation means performs an exclusive-OR operation between the reception data received by the reception means and the identification-number data assigned to the receiver.

8. The transmitter according to claim 6, wherein the reception means receives the transmission signal and performs demodulation processing based on the orthogonal frequency division multiplex method on the transmission signal.

9. The transmitter according to claim 6, wherein the reception means receives the transmission signal and performs demodulation processing based on a code division multiple access method on the transmission signal.

10. A receiver for receiving a transmission signal transmitted from a transmitter, comprising:

reception means for receiving the transmission signal;

logical operation means for performing a logical operation between reception data received by the reception means and identification-number data assigned to the receiver;

error detection means for detecting an error in output data outputted from the logical operation means in accordance with an error detection code added to the output data and for ceasing use of the output data when the error is detected; and numerical operation means for supplying, to the logical operation means, the identification-number data in which a length of the identification-number data is equalized with a length of the reception data by applying a predetermined numerical operation to the identification-number data when the length of the identification-number data is larger than the length of the reception data.

11. A communication system comprising:

a transmitter having:

error-detection-code addition means for adding an error detection code to input data, first logical operation means for generating transmission data by performing a logical operation between first output data outputted from the error-detection-code addition means and first identification-number data assigned to the transmitter, transmission means for transmitting a transmission signal generated by applying predetermined transmission processing to the transmission data, and first data addition means for supplying, to the first logical operation means, the first identification-number data in which a length of the first identification-number data is equalized with a length of the first output data by adding desired data to the first identification-number data when the length of the first identification-number data is smaller than the length of the first output data, and a receiver having:

reception means for receiving the transmission signal, second logical operation means for performing the logical operation between reception data received by the reception means and second identification-number data assigned to the receiver which is identical to the first identification-number data, error detection means for detecting an error in a second output data outputted from the second logical operation means in accordance with the error detection code added to the second output data and for ceasing use of the second output data when the error is detected, and second data addition means for supplying, to the second logical operation means, the second identification-number data in which a length of the second identification-number data is equalized with a length of the reception data by adding desired data to the second identification-number data when the length of the second identification-number data when the length of the second identification-number data is smaller than the length of the reception data.

12. The communication system according to claim 11, wherein:

the first logical operation means performs an exclusive-OR operation between the first output data output from the error-detection-code addition means and the first identification-number data assigned to the transmitter; and the second logical operation means performs the exclusive-OR operation between the reception data received by the reception means and the second identification-number data assigned to the receiver which is identical to the first identification-number data.

13. The communication system according to claim 11, wherein:

the transmission means performs transmission processing based on an orthogonal frequency division multiplex method on the transmission data to generate the transmission signal and transmits the transmission signal; and the reception means receives the transmission signal to perform demodulation processing based on the orthogonal frequency division multiplex method on the transmission signal.

14. The communication system according to claim 11, wherein:

the transmission means performs transmission processing based on a code division multiple access method on the transmission data to generate the transmission signal and transmits the transmission signal; and the reception means receives the transmission signal to perform demodulation processing based on the code division multiple access method on the transmission signal.

15. A communication system comprising:

a transmitter having:

error-detection-code addition means for adding an error detection code to input data, first logical operation means for generating transmission data by performing a logical operation between first output data outputted from the error-detection-code addition means and first identification-number data assigned to the transmitter, transmission means for transmitting a transmission signal generated by applying predetermined transmission processing to the transmission data, and first numerical operation means for supplying, to the first logical operation means, the first identification-number data in which a length of the first identification-number data is equalized with a length of the first output data by applying a first predetermined numerical operation to the first identification-number data when the length of the first identification-number data is large than the length of the first output data, and a receiver having:

reception means for receiving the transmission signal, second logical operation means for performing the logical operation between reception data received by the reception means and second identification-number data assigned to the receiver which is identical to the first identification-number data, error detection means for detecting an error in a second output data outputted from the second logical operation means in accordance with the error detection code added to the second output data and for ceasing use of the second output data when the error is detected, and second numerical operation means for supplying, to the second logical operation means, the second identification-number data in which a length of the second identification-number data is equalized with a length of the reception data by applying a second predetermined numerical operation to the second identification-number data when the length of the second identification-number data is larger than the length of the reception data.

16. A communication method comprising the steps of:

generating first output data by adding an error detection code to input data;

generating transmission data by performing a logical operation between the first output data and first identification-number data;

generating and transmitting a transmission signal by applying a predetermined transmission processing to the transmission data;

generating second output data by performing the logical operation between reception data obtained by receiving the transmission signal and second identification-number data identical to the first identification-number data;

detecting an error in the second output data in accordance with the error detection code added to the second output data and for ceasing use of the second output data when the error is detected;

equalizing a length of the first identification-number data with a length of the first output data by adding desired data to the first identification-number data when the length of the first identification-number data is smaller than the length of the first output data; and equalizing a length of the second-identification-number data with a length of the reception data by adding desired data to the second identification-number data when the length of the second identification-number data is smaller than the length of the reception data.

17. The communication method according to claim 16 further comprising the steps of:

performing an exclusive-OR operation between the first output data and the first identification-number data; and performing the exclusive-OR operation between the reception data and the second identification-number data which is identical to the first identification-number data.

18. The communication method according to claim 16 further comprising the steps of:

performing transmission processing based on an orthogonal frequency division multiplex method on the transmission data to generate the transmission signal to be transmitted; and receiving the transmission signal and performing demodulation processing based on the orthogonal frequency division multiplex method on the transmission signal.

19. The communication method according to claim 16 further comprising the steps of;

performing transmission processing based on a code division multiple access method on the transmission data to generate the transmission signal to be transmitted; and receiving the transmission signal and performing demodulation processing based on the code division multiple access method on the transmission signal.

20. A communication method comprising the steps of:

generating first output data by adding an error detection code to input data;

generating transmission data by performing a logical operation between the first output data and first identification-number data;

generating and transmitting a transmission signal by applying a predetermined transmission processing to the transmission data;

generating second output data by performing the logical operation between reception data obtained by receiving the transmission signal and second identification-number data identical to the first identification-number data;

detecting an error in the second output data in accordance with the error detection code added to the second output data and for ceasing use of the second output data when the error is detected;

equalizing a length of the first identification-number data with a length of the first output data by applying a first predetermined numerical operation to the first predetermined numerical operation to the first identification-number data when the length of the first identification-number data is larger than the length of the first output data; and equalizing a length of the second identification-number data with a length of the reception data by applying a second predetermined numerical operation to the second identification-number data when the length of the second identification-number data is larger than the length of the reception data.

* * * * *